A. TAICHER.
DRAFT ATTACHMENT.
APPLICATION FILED JAN. 22, 1912.
1,029,093.
Patented June 11, 1912.
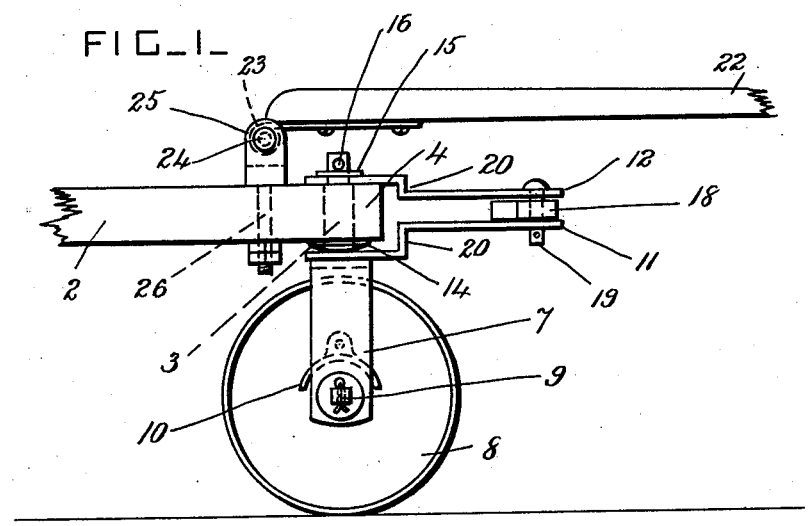
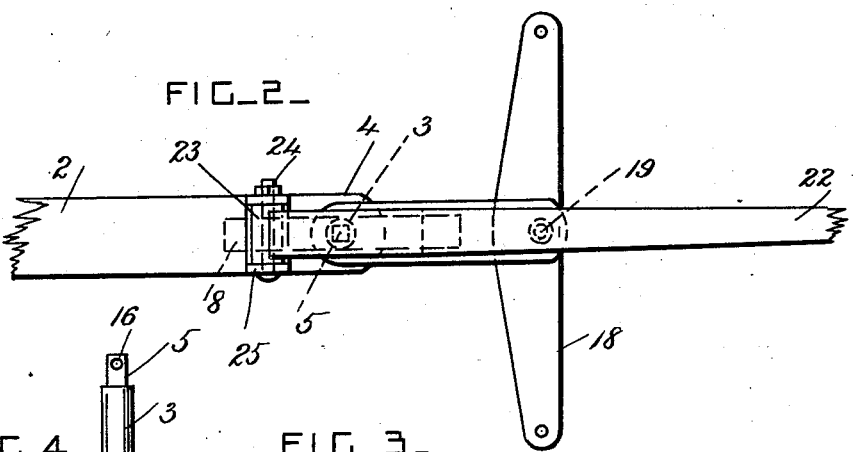
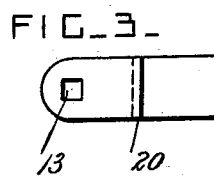
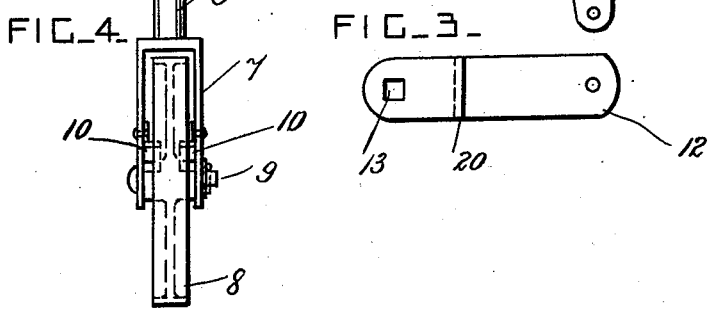
Witnesses
C. P. Fiske.
Walter Allen
Inventor
Adolph Taicher,
By Hubert W. T. Jenner.
Attorney

UNITED STATES PATENT OFFICE.

ADOLPH TAICHER, OF MARIBEL, WISCONSIN.

DRAFT ATTACHMENT.

1,029,093.  Specification of Letters Patent.  Patented June 11, 1912.

Application filed January 22, 1912. Serial No. 672,630.

*To all whom it may concern:*

Be it known that I, ADOLPH TAICHER, a citizen of the United States, residing at Maribel, in the county of Manitowoc and State of Wisconsin, have invented certain new and useful Improvements in Draft Attachments; and I do hereby declare the following to be a full, clear, and exact description of the invention, such as will enable others skilled in the art to which it appertains to make and use the same.

This invention relates to draft attachments for disk harrows and other similar implements; and it consists in the novel construction and combination of the parts hereinafter fully described and claimed.

In the drawings, Figure 1 is a side view of a draft attachment constructed according to this invention. Fig. 2 is a plan view of the attachment. Fig. 3 is a detail plan view of the upper link. Fig. 4 is a detail front view of the ground wheel and its pivoted supporting spindle.

The harrow or other implement to be drawn along is provided with a main draft pole 2. A vertical spindle 3 is journaled in a bearing 4 at the front end portion of the draft pole. This spindle has a square projection 5 at its upper end, and a forked bracket 7 at its lower part. A ground wheel 8 is journaled on a pin 9 in the forked bracket 7, and is of any approved construction. Guard plates 10 are secured to the bracket over the ends of the wheel hub to prevent dirt from penetrating to the pin 9.

A lower link 11 is mounted on the spindle 3 below the draft pole, and an upper link 12 is provided with a square hole 13 which engages with the square projection 5 on the spindle above the draft pole. Washers 14 and 15 are provided on the spindle for spacing the parts, and resisting wear, and a pin 16, or other approved fastening device, is provided for holding the spindle and links in place.

A whiffletree 18 is pivoted by a pin 19 to the front end portions of the links, which are preferably provided with offset portions 20, and which project in front of the draft pole. The two animals for drawing the harrow are harnessed to the ends of the whiffletree in the usual manner.

An auxiliary draft pole 22 is provided, and has an eye 23 secured to its rear end portion. This eye 23 is connected by a pin 24 to a double-eye 25, which has a vertical stem 26 for connecting it to the main draft pole 2 at a little distance behind the spindle 3. The stem 26 has nuts screwed on its lower end portion for holding it in place.

The auxiliary draft pole is not required on level ground, but when the ground is hilly the front end of the auxiliary draft pole is connected to the harness of the animals so that the harrow may be prevented from sliding forward against their hind legs, when the harrow is being drawn down a steep incline.

The wheel 8 is turned on the axis of the spindle 3, when the animals are turned, by means of the upper link and the square projection, and the wheel 8 regulates the action of the disk harrow. When the auxiliary draft pole is not required in use it can be folded over backward so as to be out of the way.

What I claim is:

1. In a draft attachment, the combination, with a main draft pole, of a vertical spindle journaled in the front end portion of the pole and having a bracket at its lower part and a rectangular projection at its upper part, a ground wheel journaled in the said bracket, a pair of links engaging with the said spindle, the upper link of the pair being provided with a rectangular hole which engages with the said projection, a whiffletree pivoted to the front ends of the said links, a double-eye provided with a vertical stem which connects it to the main draft pole behind the said spindle, and an auxiliary draft pole pivoted to the said double-eye and projecting above and across the said whiffletree.

2. In a draft attachment, the combination, with a main draft pole, a vertical spindle journaled at the front end of the said pole, a ground wheel carried by the said spindle, a steering link secured to the said spindle and projecting in front of the draft pole, and a whiffletree pivoted to the front end of the said steering link; of a vertical stem secured to the said main draft pole behind the said spindle, and an auxiliary draft
5 pole pivoted to the upper end of the said stem and projecting above and across the said whiffletree.

In testimony whereof I have affixed my signature in the presence of two witnesses.

ADOLPH TAICHER.

Witnesses:
 FRANK J. SLEGER,
 JOSEPH DOUBEK.

---

Copies of this patent may be obtained for five cents each, by addressing the "Commissioner of Patents. Washington, D. C."